United States Patent
Dekoning

(10) Patent No.: US 6,805,229 B2
(45) Date of Patent: Oct. 19, 2004

(54) TELESCOPING TUBE CONVEYOR

(76) Inventor: Adrianus Petrus Jacoba Dekoning, P.O. Box 64, Eden, Manitoba (CA), R0J 0M0

( * ) Notice: Subject to any disclaimer, the term of this patent is extended or adjusted under 35 U.S.C. 154(b) by 0 days.

(21) Appl. No.: 10/641,269

(22) Filed: Aug. 14, 2003

(65) Prior Publication Data

US 2004/0031662 A1 Feb. 19, 2004

(51) Int. Cl.⁷ ............................................. B65G 15/26
(52) U.S. Cl. ..................... 198/313; 198/812; 198/306; 198/311
(58) Field of Search ................................ 198/812, 313, 198/306, 311

(56) References Cited

U.S. PATENT DOCUMENTS

| | | | | |
|---|---|---|---|---|
| 3,552,546 A | * | 1/1971 | Rath ........................... | 198/306 |
| 3,557,939 A | * | 1/1971 | Lyons ......................... | 198/313 |
| 3,563,364 A | * | 2/1971 | Arndt et al. ............... | 198/316.1 |
| 3,788,452 A | * | 1/1974 | McWilliams ................ | 198/313 |
| 3,830,383 A | * | 8/1974 | Skippon et al. ............. | 414/323 |
| 3,993,204 A | * | 11/1976 | Hummel ...................... | 414/564 |
| 4,033,463 A | * | 7/1977 | Cervin ......................... | 414/10 |
| 4,245,732 A | * | 1/1981 | Couperus .................... | 198/313 |
| 4,303,363 A | * | 12/1981 | Cervin ......................... | 414/10 |
| 4,303,506 A | * | 12/1981 | Finlay ......................... | 209/247 |
| 4,354,670 A | * | 10/1982 | Eichbaum et al. .......... | 266/281 |
| 4,427,104 A | * | 1/1984 | Reid, Jr. ...................... | 198/306 |
| 4,523,669 A | * | 6/1985 | Smith .......................... | 198/313 |
| 4,643,299 A | * | 2/1987 | Calundan .................... | 198/812 |
| 4,813,526 A | * | 3/1989 | Belanger ..................... | 198/313 |
| 5,203,442 A | * | 4/1993 | Oury et al. .................. | 198/313 |
| 5,490,592 A | * | 2/1996 | Best et al. ................... | 198/812 |
| 5,515,961 A | * | 5/1996 | Murphy et al. ............. | 198/302 |
| 5,685,416 A | * | 11/1997 | Bonnet ........................ | 198/812 |
| 5,833,043 A | * | 11/1998 | Schmidgall et al. ........ | 198/302 |
| 6,056,252 A | * | 5/2000 | Johannsen ................... | 248/188.3 |
| 6,360,876 B1 | * | 3/2002 | Nohl et al. .................. | 198/588 |
| 6,705,443 B2 | * | 3/2004 | Kettler et al. ............... | 192/43.2 |

* cited by examiner

Primary Examiner—Rashmi K. Sharma
(74) Attorney, Agent, or Firm—Middleton Reutlinger

(57) ABSTRACT

A conveyor apparatus comprises an upper conveyor tube. A lower conveyor tube has an open upper discharge end telescopically engaged with the upper conveyor tube, and an intake hopper mounted on a lower intake end. A telescope actuator selectively extends and retracts the lower conveyor tube. Wheels are attached to the upper conveyor tube to support the lower end of the upper conveyor tube and the lower conveyor tube. The wheels are oriented for travel transverse to the conveyor tubes, and an elevating actuator is operative to raise and lower the wheels. A conveyor belt has a top run that passes through the hopper and conveyor tubes, and a belt drive moves the top run of the conveyor belt up through the conveyor tubes to carry material from the intake hopper to the upper discharge end of the upper conveyor tube.

16 Claims, 4 Drawing Sheets

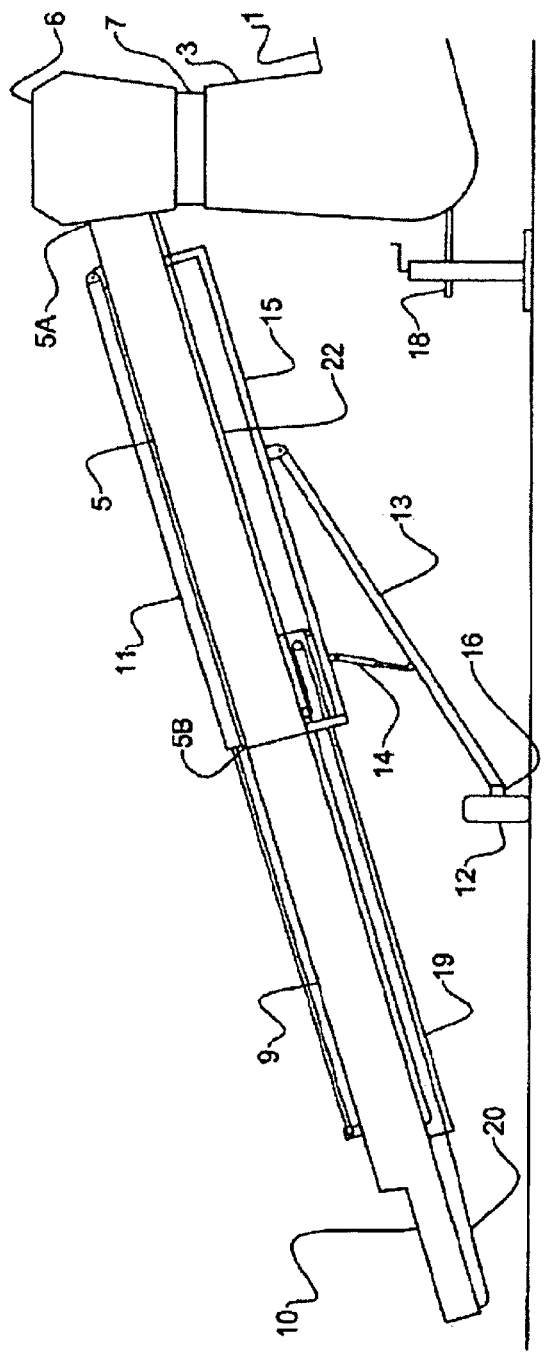
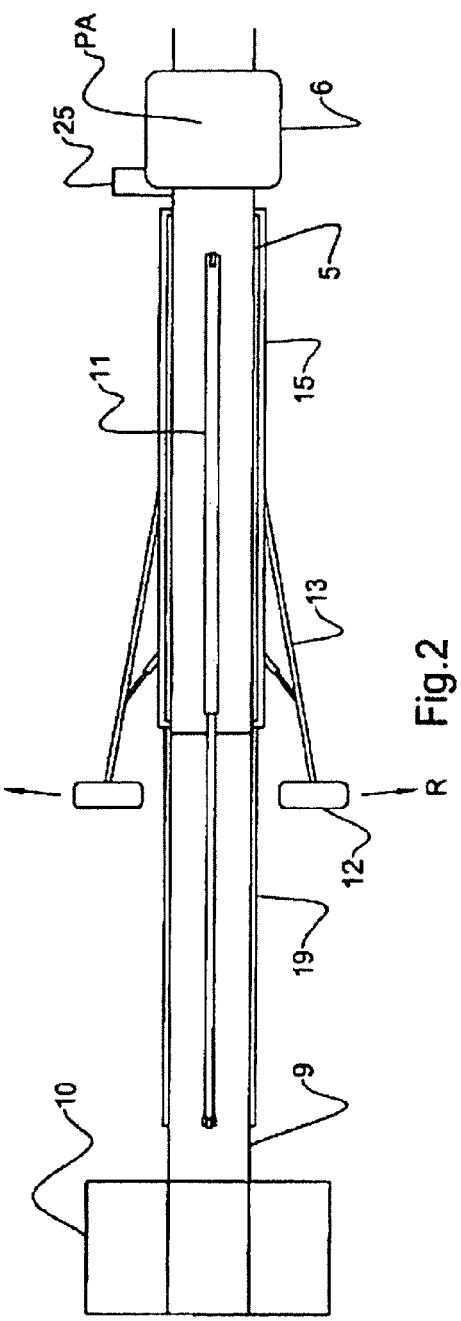
Fig. 1
Fig. 2

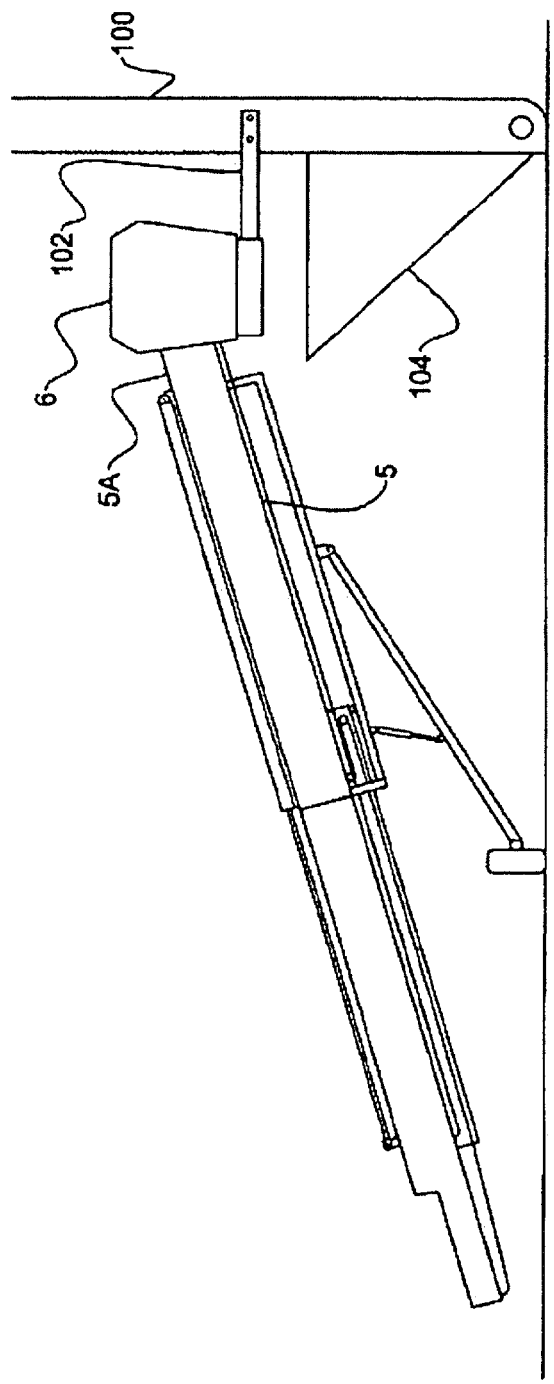
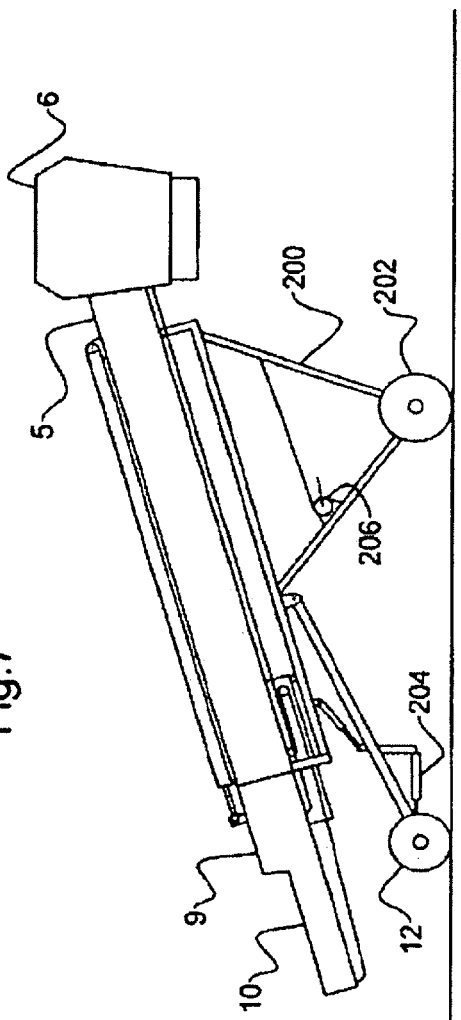
Fig.7
Fig.8

TELESCOPING TUBE CONVEYOR

CROSS-REFERENCE TO PRIOR APPLICATIONS

This application claims priority to and benefit of Canadian Patent Application No. 2,398,015, filed on Aug. 14, 2002, currently pending. It is incorporated herein by reference.

FIELD OF THE INVENTION

This invention is in the field of conveyors and in particular such a conveyor for unloading granular material from a belly dump transport vehicle.

BACKGROUND OF THE INVENTION

A common problem in material handling is that of unloading granular material from belly dump trailers, rail cars and like transport vehicles. Such vehicles have a discharge located at the bottom of the hoppered cargo container under the center of the vehicle.

Conventionally, such belly dump vehicles are driven over a pit that has a conveyor connected thereto for carrying the material away. Rather than construct a permanent pit, alternative equipment for unloading such belly dump vehicles has been developed. Examples are disclosed in U.S. Pat. No. 5,297,914 to Ash, and U.S. Pat. No. 5,435,689 to Stonehouse. With these apparatuses a belly dump trailer is driven over a ramp so that the center discharge is located above a conveyor.

Belly dump vehicles are also unloaded using a short transfer conveyor having an intake hopper and a discharge end. The transport conveyor must be maneuvered into an operating position wherein the hopper is located under the center discharge of the vehicle and the conveyor discharge is located above the intake of a primary conveyor. Considerable jockeying of the conveyor and the vehicle is sometimes required to attain a satisfactory operating position since the vehicle must be located at the proper distance laterally from the primary conveyor intake, and fore and aft with respect to that intake, to allow the fixed length transfer conveyor to be positioned.

Similarly "swing away" conveyors are known where the discharge end of a short transport conveyor is pivotally attached to the intake end of a primary conveyor. The opposite end of the transport conveyor has an intake hopper and wheels fixed at the outside end of the hopper that are oriented to allow the intake end to pivot about the discharge end. The belly dump vehicle is driven along side and the intake hopper is swung under the center discharge. Again the belly dump vehicle must be located at the proper distance so that the intake hopper can be properly position under the central discharge.

In some situations the intake of a primary conveyor can be maneuvered into the operating position, however the angle of elevation of the primary conveyor required to reach the input doors of many storage bins is such that this is often not possible. In any event it is awkward to maneuver the primary conveyor, and the concept of the short transfer conveyor was developed to avoid the problems inherent in unloading from the central discharge directly into the primary conveyor.

U.S. Pat. No. 5,499,899 to Hibbs discloses a mobile belt conveyor having a horizontal intake section that can be extended under the central discharge of a rail car or the like. The horizontal intake section is oriented at an angle to the primary conveyor itself, and the belt travels around the primary conveyor and intake section with the intake section extending and retracting from the lower end of the primary conveyor.

Telescoping belt conveyors are also known, for example as disclosed in U.S. Pat. No. 6,360,876 to Nohl et al., U.S. Pat. No. 6,003,658 to Best et al., and U.S. Pat. No. 4,624,357 to Oury et al.

SUMMARY OF THE INVENTION

It is an object of the present invention to provide a conveyor for unloading belly dump vehicles. It is a further object of the present invention to provide such a conveyor that has a lower telescoping section with a hopper mounted on the end, and wheels oriented for transverse movement such that the hopper may be readily positioned under a belly dump discharge.

The present invention provides, in one aspect, a conveyor apparatus comprising an upper conveyor tube having an upper discharge end and an open lower intake end. A lower conveyor tube has an open upper discharge end telescopically engaged with the upper conveyor tube, and a lower intake end with an intake hopper mounted on the lower intake end. A telescope actuator is operative to selectively extend and retract the lower conveyor tube with respect to the upper conveyor tube. At least one wheel is attached to the upper conveyor tube and is operative to support the lower intake end of the upper conveyor tube and the lower conveyor tube. The at least one wheel is oriented for travel transverse to the upper and lower conveyor tubes, and an elevating actuator is operative to raise and lower the at least one wheel with respect to the upper conveyor tube. A conveyor belt has a top run that passes through the hopper, lower conveyor tube, and upper conveyor tube, and a bottom run that passes under the conveyor tubes. A belt drive is operative to move the top run of the conveyor belt up through the conveyor tubes to carry material from the intake hopper to the upper discharge end of the upper conveyor tube.

In a second aspect the invention provides a conveyor apparatus comprising a primary conveyor having a primary intake operative to receive material for conveyance up the primary conveyor. An upper conveyor tube has an upper discharge end and an open lower intake end, and the upper discharge end is operatively connected to the primary intake such that the upper conveyor tube can pivot with respect to the primary intake, and such that the upper discharge end is supported by the primary intake. A lower conveyor tube has an open upper discharge end telescopically engaged with the upper conveyor tube, and a lower intake end with an intake hopper mounted thereon. A telescope actuator is operative to selectively extend and retract the lower conveyor tube with respect to the upper conveyor tube. A plurality of wheels are attached to the upper conveyor tube and are operative to support the lower intake end of the upper conveyor tube and the lower conveyor tube. The wheels are oriented for travel transverse to the upper and lower conveyor tubes, and a wheel drive is operative to rotate at least one wheel selectively in both directions. An elevating actuator is operative to raise and lower the wheels with respect to the upper conveyor tube. A conveyor belt has a top run that passes through the hopper, lower conveyor tube, and upper conveyor tube, and a bottom run that passes under the conveyor tubes. A belt drive is operative to move the top run of the conveyor belt up through the conveyor tubes to carry material from the intake hopper to the upper discharge end of the upper conveyor tube and into the primary intake.

The apparatus is readily maneuvered to a position under the belly dump discharge. To situate the belly dump vehicle in a position adjacent the apparatus the apparatus is moved out of the way by telescoping or swinging on the wheels. Once the belly dump vehicle is approximately in position, the hopper can be moved transversely on the wheels and longitudinally with the telescope actuator. The belly dump vehicle must be located only within a substantial range of fore and aft and in and out positions, reducing the time and effort required to position the vehicle.

Conveniently at least one of the wheels is driven by a hydraulic motor or the like, such that effort is further reduced. The upper conveyor tube and wheels only pivot about the upper discharge end of the upper conveyor tube. The lower conveyor tube and hopper can be raised up and down by the elevating actuator so that the lower conveyor tube can telescope easily with no resistance from wheels or skids resting on the ground and moving over bumps, holes and the like.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 1 is a side view of an embodiment of the invention in an extended position;

FIG. 2 is a top view of the embodiment in the extended position;

FIG. 7 is a side view of another alternate embodiment wherein the discharge end of the upper conveyor tube is pivotally attached to a bracket above the intake of a bucket elevator;

FIG. 8 is a side view of yet another alternate embodiment wherein the upper and lower conveyor tubes are mounted on a transport frame for independent movement.

DETAILED DESCRIPTION OF THE PREFERRED EMBODIMENTS

Figure 3:
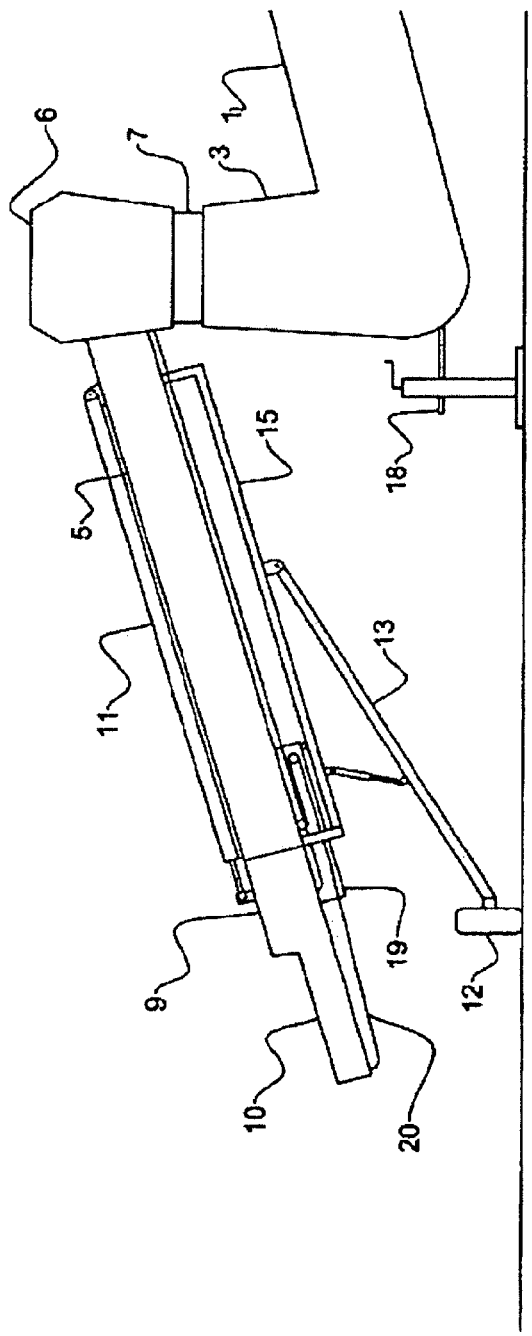
FIG. 3 is a side view of the embodiment in a retracted position.

FIGS. 1–3 illustrates a conveyor apparatus comprising a primary conveyor 1 having a primary intake 3 operative to receive material for conveyance up the primary conveyor 1. Only the lower portion is illustrated, as the primary conveyor 1 could be any conventional conveyor. FIGS. 1 and 2 illustrate the apparatus in an extended position and FIG. 3 illustrates the same apparatus in a retracted position.

An upper conveyor tube 5 has an upper discharge end 5A and an open lower intake end 5B. The upper discharge end 5A is operatively connected to the primary intake 3 such that material conveyed up the upper conveyor tube 5 is discharged into primary intake 3 and then up the primary conveyor 1. A discharge hood 6 is attached to the discharge end 5 A and a connector ring 7 pivotally connects the lower end of the discharge hood 6 to the primary intake 3.

The upper conveyor tube 5 can pivot with respect to the primary intake 3, and the weight of the upper discharge end 5A is supported by the primary intake 3.

A lower conveyor tube 9 has an open upper discharge end telescopically engaged with the upper conveyor tube 5, and a lower intake end with an intake hopper 10 mounted thereon. The upper conveyor tube 5 is mounted on the top side of a main frame 15 and the lower conveyor tube 9 is mounted on the top side of a sub-frame 19 that is telescopically engaged with the main frame 15.

A hydraulic cylinder serves as a telescope actuator 11 operative to selectively extend and retract the lower conveyor tube 9 and attached sub-frame 19 with respect to the upper conveyor tube 5 and attached main frame 15.

Wheels 12 are attached to wheel arms 13 that are pivotally attached to the main frame 15. A hydraulic cylinder serves as an elevating actuator 14 operative to raise and lower the wheels 12 with respect to the upper conveyor tube 5 and main frame 15. The wheels 12 are operative to support the lower intake end 5B of the upper conveyor tube 5 and the lower conveyor tube 9 and hopper 10. The weight of the upper conveyor tube 5, main frame 15, lower conveyor tube 9, and sub-frame 19 is thus supported by the wheels 12 and the primary intake 3.

The wheels 12 are oriented for travel transverse to the upper and lower conveyor tubes 5, 9. A wheel drive 16, conveniently a hydraulic motor, is operative to rotate one or more of the wheels 12 selectively in both forward and rearward directions F, R as illustrated in FIG. 2 so that the hopper pivots about pivot axis PA. In a typical operating position the tubes 5, 9 will extend to one side or the other of the primary intake 3 and a tractor is attached to the hitch 18 of the primary conveyor 1 to provide a drive for the primary conveyor 1 and hydraulic power to operate the hydraulic cylinders of the apparatus.

Figure 4:
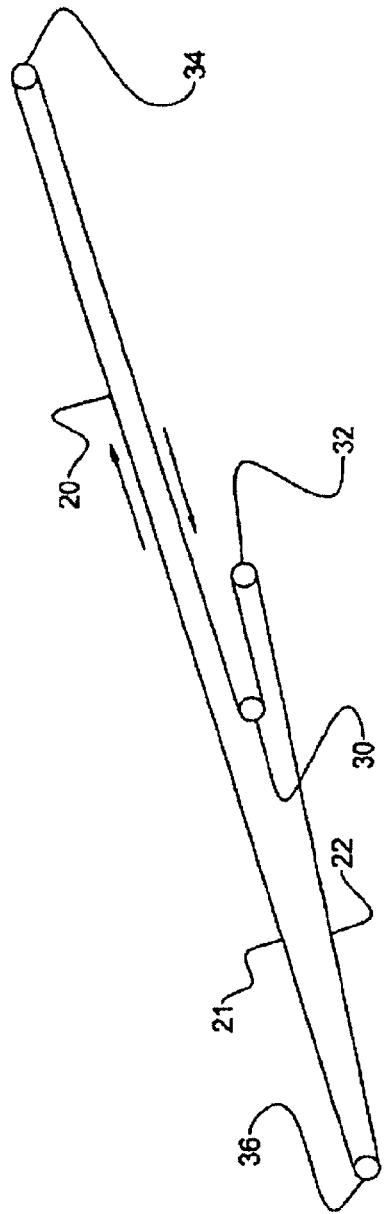
FIG. 4 is a schematic side view of the conveyor belt configuration in the extended position.
Figure 5:
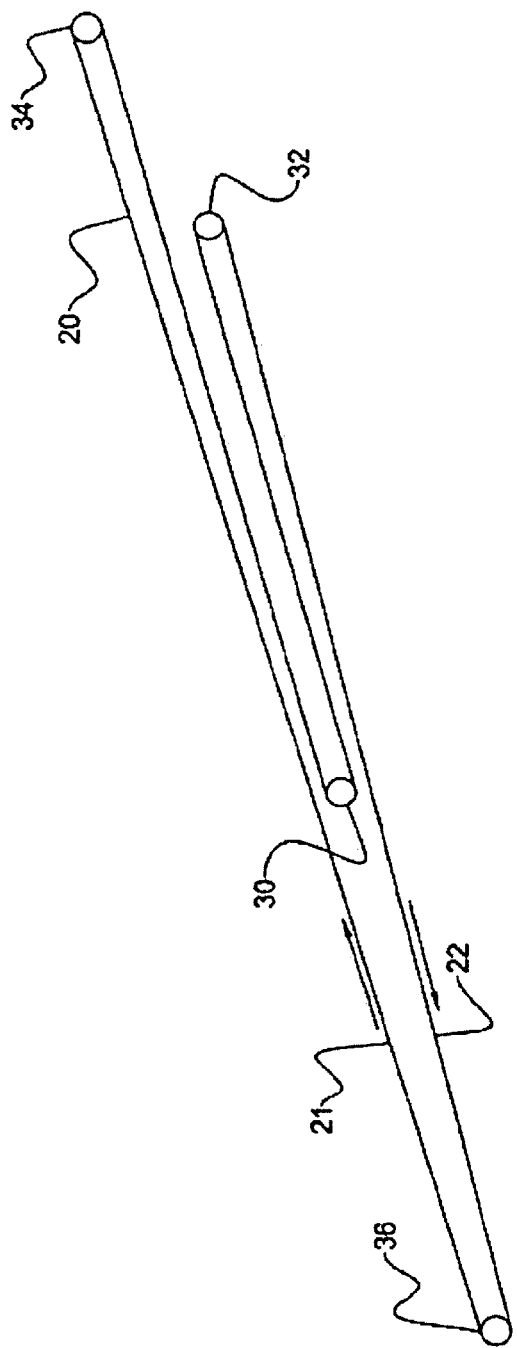
FIG. 5 is a schematic side view of the conveyor belt configuration in the retracted position.

As schematically illustrated in FIGS. 4 and 5, a conveyor belt 20 has a top run 21 that passes through the hopper 10, lower conveyor tube 9, and upper conveyor tube 5. The bottom run 22 passes under the conveyor tubes 5, 9. A belt drive 25 is operative to move the top run 21 of the conveyor belt 20 up through the conveyor tubes 5, 9 to carry material from the intake hopper 10 to the upper discharge end 5A of the upper conveyor tube 5 and into the primary intake 3. Conveniently the belt drive 25 comprises a hydraulic motor, or a conventional drive-line can be incorporated connecting the primary drive of the primary conveyor 1 and a belt drive roller.

A first idler roller 30 mounted on the main frame 15 which is attached to the upper conveyor tube 5. A second idler roller 32 mounted on the sub-frame 19 which is attached to the lower conveyor tube 9. From the top roller 34, the lower run 22 of the belt 20 passes around the first idler roller 30 then around the second idler roller 32 and then to the lower roller 36 at the intake hopper 10. Thus the second idler roller 32 and lower roller 36 move together as the lower conveyor tube 9 telescopes from the extended position of FIG. 4 to the retracted position of FIG. 5. The length of the belt 20 remains constant and the configuration of the rollers 30, 32, 34, 36 provides a constant travel length regardless of the retracted or extended position of the lower conveyor tube 9, and proper tension on the conveyor belt is maintained.

Figure 6:
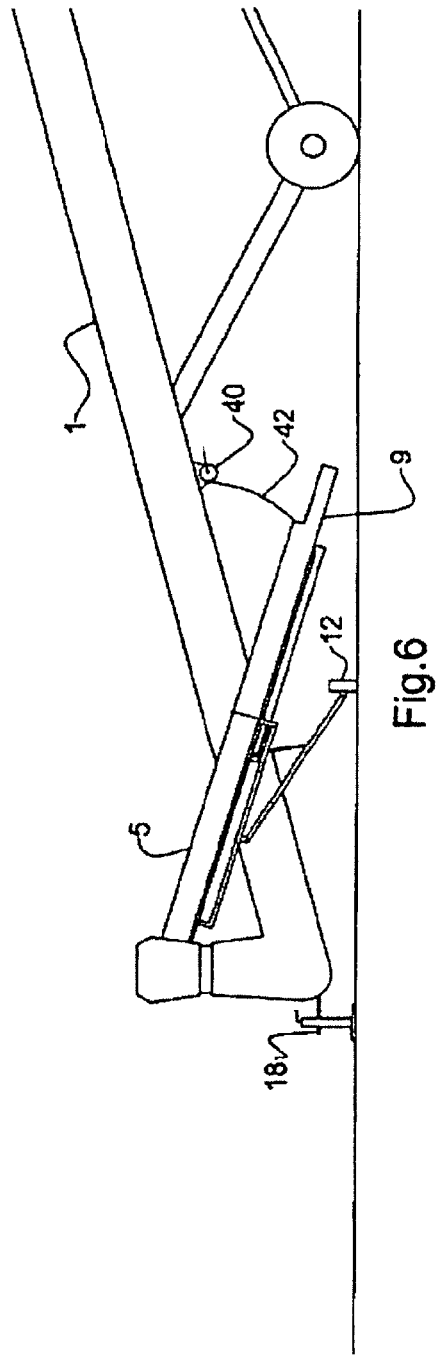
FIG. 6 illustrates the use of a winch to raise the hopper and wheels from the ground so they are supported on the primary conveyor for transport.

Illustrated in FIG. 6 is a winch 40 attached to the primary conveyor 1 and connected by a cable 22 to the lower conveyor tube 9. Cranking the winch 40 raises the wheels 12 and the intake hopper 10 above the ground to be supported by the primary conveyor 1. The whole apparatus can then be towed by a vehicle attached to the hitch 18 of the primary conveyor 1.

FIG. 7 illustrates an alternate embodiment wherein the primary conveyor comprises a bucket elevator 100, and wherein the discharge hood 6 at the upper discharge end 5A of the upper conveyor tube 5 is pivotally attached to a bracket 102 attached above an intake 104 of the bucket elevator 100.

FIG. 8 illustrates an alternative embodiment comprising a transport frame 200 and transport wheels 202. The main frame illustrated above is essentially incorporated into the transport frame 200, and the upper conveyor tube 5 and wheels 12 in this embodiment are attached to the transport frame 200. This embodiment is essentially free standing and can be used with various primary conveyors, or as a primary conveyor itself.

The embodiment of FIG. 8 also comprises a pivot actuator 204 operative to pivot the wheels with respect to the transport frame 200 to enable movement of the apparatus in a direction substantially aligned with the conveyor tubes 5, 9. As before the wheels 12 can be moved up and down to control the height of the hopper 10. Also illustrated is an elevating winch 206 operative to raise and lower the tubes 5, 9 and discharge hood 6. A conventional motor can be mounted on the transport frame 200 to provide drives for the conveyor belt and hydraulic cylinders.

In the embodiments illustrated above, the hopper 10 can be moved in or out and forward or rearward into an operating position to under the discharge of a belly dump vehicle. As long as the belly dump vehicle is parked within a reasonable range, the hopper can be manipulated into position rather than jockeying the vehicle. At times, wind can cause spillage during discharge as the material falls to the hopper 10. With the apparatus of the invention the hopper 10 can also be raised to a position close to the discharge, reducing such spillage.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. A conveyor apparatus comprising:
    an upper conveyor tube having an upper discharge end and an open lower intake end;
    a lower conveyor tube having an open upper discharge end telescopically engaged with the upper conveyor tube, and a lower intake end with an intake hopper mounted on the lower intake end;
    a telescope actuator operative to selectively extend and retract the lower conveyor tube with respect to the upper conveyor tube;
    at least one wheel attached to the upper conveyor tube and operative to support the lower intake end of the upper conveyor tube and the lower conveyor tube, the at least one wheel oriented for travel transverse to the upper and lower conveyor tubes;
    an elevating actuator operative to raise and lower the at least one wheel with respect to the upper conveyor tube;
    a conveyor belt having a top run that passes through the hopper, lower conveyor tube, and upper conveyor tube, and having a bottom run that passes under the conveyor tubes; and
    a belt drive operative to move the top run of the conveyor belt up through the conveyor tubes to carry material from the intake hopper to the upper discharge end of the upper conveyor tube.

2. The apparatus of claim 1 further comprising a wheel drive operative to rotate the at least one wheel selectively in forward and reverse directions.

3. The apparatus of claim 1 further comprising a first idler roller mounted on the upper conveyor tube and a second idler roller mounted on the lower conveyor tube, and wherein the lower run of the belt passes around the first idler roller, then around the second idler roller and then to the intake hopper such that proper tension on the conveyor belt is maintained as the lower conveyor tube extends and retracts.

4. The apparatus of claim 1 wherein the upper conveyor tube is mounted on the top side of a main frame and the lower conveyor tube is mounted on the top side of a sub-frame that is telescopically engaged with the main frame.

5. The apparatus of claim 4 further comprising a first idler roller mounted on the main frame and a second idler roller mounted on the sub-frame, and wherein the lower run of the belt passes around the first idler roller, then around the second idler roller and then to the intake hopper such that proper tension on the conveyor belt is maintained as the lower conveyor tube and the attached sub-frame extends and retracts.

6. The apparatus of claim 4 comprising two wheels attached to a lower end of the main frame.

7. The apparatus of claim 1 wherein the upper discharge end of the upper conveyor tube is adapted for pivotal attachment above an intake of a primary conveyor such that material discharged therefrom is directed into the intake of the primary conveyor, and such that the pivotal attachment and at least one wheel bear a weight of the apparatus.

8. The apparatus of claim 7 wherein the primary conveyor comprises a bucket elevator, and wherein the upper discharge end is adapted for pivotal attachment via a bracket adapted fro attachment adjacent to an intake of the bucket elevator.

9. The apparatus of claim 6 wherein the primary conveyor is a portable inclined conveyor powered by a primary drive, and wherein the upper discharge end is adapted for pivotal attachment to an intake end of the inclined conveyor, and further comprising a winch adapted for connection between the primary conveyor and the at least one wheel such that the winch is operative to raise the at least one wheel and the intake hopper above the ground to be supported by the primary conveyor.

10. The apparatus of claim 9 wherein the belt drive comprises a drive-line operatively connected to the primary drive.

11. The apparatus of claim 1 further comprising a transport frame attached to the upper conveyor tube and operative to support the upper discharge end of the upper conveyor tube, and transport wheels operative to support the transport frame for movement of the apparatus along the ground.

12. The apparatus of claim 11 wherein the main frame comprises a portion of the transport frame.

13. The apparatus of claim 11 further comprising a pivot actuator operative to pivot the at least one wheel with respect to the transport frame to enable movement of the apparatus in a direction substantially aligned with the conveyor tubes.

14. A conveyor apparatus comprising:
    a primary conveyor having a primary intake operative to receive material for conveyance up the primary conveyor;

an upper conveyor tube having an upper discharge end and an open lower intake end, the upper discharge end operatively connected to the primary intake such that the upper conveyor tube can pivot with respect to the primary intake, and such that the upper discharge end is supported by the primary intake;

a lower conveyor tube having an open upper discharge end telescopically engaged with the upper conveyor tube, and having a lower intake end with an intake hopper mounted thereon;

a telescope actuator operative to selectively extend and retract the lower conveyor tube with respect to the upper conveyor tube;

a plurality of wheels attached to the upper conveyor tube and operative to support the lower intake end of the upper conveyor tube and the lower conveyor tube, the wheels oriented for travel transverse to the upper and lower conveyor tubes;

a wheel drive operative to rotate at least one wheel selectively in both directions;

an elevating actuator operative to raise and lower the wheels with respect to the upper conveyor tube;

a conveyor belt having a top run that passes through the hopper, lower conveyor tube, and upper conveyor tube, and having a bottom run that passes under the conveyor tubes; and a belt drive operative to move the top run of the conveyor belt up through the conveyor tubes to carry material from the intake hopper to the upper discharge end of the upper conveyor tube and into the primary intake.

15. The apparatus of claim 14 further comprising a first idler roller mounted on the upper conveyor tube and a second idler roller mounted on the lower conveyor tube, and wherein the lower run of the belt passes around the first idler roller, then around the second idler roller and then to the intake hopper such that proper tension on the conveyor belt is maintained as the lower conveyor tube extends and retracts.

16. The apparatus of claim 14 further comprising a winch connected between the primary conveyor and the wheels such that the winch is operative to raise the wheels and the intake hopper above the ground to be supported by the primary conveyor.

* * * * *